US009801028B2

(12) United States Patent
Ma et al.

(10) Patent No.: US 9,801,028 B2
(45) Date of Patent: Oct. 24, 2017

(54) MULTIMEDIA BROADCAST MULTICAST SERVICE (MBMS) UTILIZING SPATIAL MULTIPLEXING

(75) Inventors: Jianglei Ma, Kanata (CA); Aaron Callard, Ottawa (CA); Ming Jia, Ottawa (CA); Wen Tong, Ottawa (CA); Peiying Zhu, Kanata (CA); Hang Zhang, Nepean (CA)

(73) Assignee: Apple Inc., Cupertino, CA (US)

(*) Notice: Subject to any disclaimer, the term of this patent is extended or adjusted under 35 U.S.C. 154(b) by 1702 days.

(21) Appl. No.: 12/933,740

(22) PCT Filed: Mar. 20, 2009

(86) PCT No.: PCT/IB2009/000567
§ 371 (c)(1),
(2), (4) Date: Sep. 21, 2010

(87) PCT Pub. No.: WO2009/115912
PCT Pub. Date: Sep. 24, 2009

(65) Prior Publication Data
US 2011/0019605 A1    Jan. 27, 2011

Related U.S. Application Data

(60) Provisional application No. 61/038,506, filed on Mar. 21, 2008.

(51) Int. Cl.
*H04L 12/28* (2006.01)
*H04W 4/06* (2009.01)
(Continued)

(52) U.S. Cl.
CPC ............ *H04W 4/06* (2013.01); *H04B 7/0697* (2013.01); *H04W 72/005* (2013.01); *H04W 36/30* (2013.01)

(58) Field of Classification Search
CPC ...................................................... H04W 4/06
(Continued)

(56) References Cited

U.S. PATENT DOCUMENTS 7,352,718 B1 * 4/2008 Perahia ................ H04B 7/0413
370/210
2003/0235167 A1 * 12/2003 Kuffner ........................ 370/335
(Continued)

FOREIGN PATENT DOCUMENTS

CN            101098175 A     1/2008
CN            101291451 A    10/2008
(Continued)

OTHER PUBLICATIONS

International Search Report for International Patent Application No. PCT/IB2009/000567, dated Aug. 24, 2009.
(Continued)

*Primary Examiner* — Noel Beharry
*Assistant Examiner* — Pamit Kaur
(74) *Attorney, Agent, or Firm* — Meyertons, Hood, Kivlin, Kowert & Goetzel, P.C.

(57) ABSTRACT

Systems and methods are disclosed herein for an enhanced Multimedia Broadcast Multicast Service (MBMS) in a wireless communications network. In one embodiment, a number of base stations in a MBMS zone, or broadcast region, accommodate both Spatial Multiplexing (SM) enabled user elements and non-SM enabled user elements. In another embodiment, a number of base stations form a MBMS zone, or broadcast region, where the MBMS zone is sub-divided into an SM zone and a non-SM zone. In another embodiment, the wireless communications network includes multiple MBMS zones. For each MBMS zone, base stations serving the MBMS zone transmit an MBMS zone identifier (ID) for the MBMS zone. The MBMS zone ID may be used (Continued)

by a user element for decoding and/or to determine when to perform a handoff from one MBMS zone to another.

20 Claims, 15 Drawing Sheets

(51) Int. Cl.
*H04W 72/00* (2009.01)
*H04B 7/06* (2006.01)
*H04W 36/30* (2009.01)

(58) Field of Classification Search
USPC .................................. 370/312, 342, 334, 338
See application file for complete search history.

(56) References Cited

U.S. PATENT DOCUMENTS

| | | | |
|---|---|---|---|
| 2004/0203816 A1 | 10/2004 | Bae et al. | |
| 2005/0025099 A1* | 2/2005 | Heath et al. | 370/334 |
| 2005/0111395 A1* | 5/2005 | Hwang et al. | 370/313 |
| 2005/0174981 A1* | 8/2005 | Heath, Jr. | H04W 16/14 370/342 |
| 2006/0066483 A1* | 3/2006 | Goldberg | H04B 7/08 342/378 |
| 2006/0121946 A1 | 6/2006 | Walton et al. | |
| 2007/0002766 A1* | 1/2007 | Park et al. | 370/254 |
| 2007/0165104 A1 | 7/2007 | Khan et al. | |
| 2007/0167181 A1* | 7/2007 | Ramesh | H04W 48/12 455/502 |
| 2007/0183380 A1* | 8/2007 | Rensburg et al. | 370/338 |
| 2007/0263734 A1* | 11/2007 | Seki | H04L 1/0006 375/259 |
| 2008/0037472 A1* | 2/2008 | Ryu | H04L 12/189 370/332 |
| 2008/0068979 A1 | 3/2008 | Visotsky et al. | |
| 2008/0159430 A1* | 7/2008 | Steer | H04L 27/3488 375/267 |
| 2008/0219361 A1* | 9/2008 | Guey et al. | 375/260 |
| 2008/0301749 A1* | 12/2008 | Harrar et al. | 725/131 |
| 2008/0316955 A1* | 12/2008 | Yu | H04W 72/04 370/319 |
| 2009/0092066 A1* | 4/2009 | Chindapol et al. | 370/277 |
| 2009/0135803 A1* | 5/2009 | Luo | H04L 5/0007 370/350 |
| 2009/0154386 A1* | 6/2009 | So | H04W 76/002 370/311 |

FOREIGN PATENT DOCUMENTS

| | | |
|---|---|---|
| JP | 2002-164843 | 6/2002 |
| JP | 2003032179 A | 1/2003 |
| JP | 2006-254235 | 9/2006 |
| JP | 2007536790 A | 12/2007 |
| JP | 2008-011259 | 1/2008 |
| WO | 2005032035 | 4/2005 |
| WO | 2008020736 A2 | 2/2008 |
| WO | 2008034389 A1 | 3/2008 |

OTHER PUBLICATIONS

Silva et al., "Adaptive Beamforming and Spatial Multiplexing of Unicast and Multicast Services", 17th Annual IEEE International Symposium on Personal, Indoor and Mobile Radio Communications (PIMRC'06), Sep. 11-14, 2006.
Hausl et al., "Iterative Network and Channel Decoding for the Two-Way Relay Channel", IEEE International Conference on Communications (ICC'06), vol. 4, Jun. 2006 pp. 1568-1573.
Translation of First Office Action and Search Report in CN Application No. 200980118106.9, dated Jan. 29, 2013, pp. 1-7.
Translation of Office Action in related Japanese Application No. 2011-500310, dated Apr. 16, 2013, pp. 1-3.
Office Action from Japanese Patent Application No. 2013-147527, dated May 26, 2014, English and Japanese versions, pp. 1-9.
Notice of Allowance from Japanese Application No. 201314752, dated Sep. 10, 2014, English and Japanese versions, pp. 1-6.
"Summary of LTE MIMO Session", Samsung, 3GPP TSG RAN WG1 Meeting #45, May 2006, pp. 1-5.
Office Action from Korean Application No. 10-2010-7023441, dated Apr. 17, 2015, English and Korean versions, pp. 1-7.
Office Action, Japanese Application No. 2014167190, dated Jul. 13, 2015, 11 pages.

* cited by examiner

MULTIMEDIA BROADCAST MULTICAST SERVICE (MBMS) UTILIZING SPATIAL MULTIPLEXING

This application claims the benefit of U.S. provisional patent application Ser. No. 61/038,506, filed Mar. 21, 2008, the disclosure of which is hereby incorporated herein by reference in its entirety.

FIELD OF THE DISCLOSURE

The present disclosure relates to a Multimedia Broadcast Multicast Service (MBMS) in a wireless communications network.

BACKGROUND

In Fourth Generation (4G) wireless communications networks such as Long Term Evolution (LTE) networks, base stations may utilize spatial multiplexing to increase data rates. Specifically, spatial multiplexing is a transmit scheme that allows a base station having multiple transmit antennas to simultaneously transmit independent and separately encoded data streams from each of the transmit antennas using the same transmit resources. For instance, using spatial multiplexing, a base station that utilizes Orthogonal Frequency Division Multiplexing (OFDM) is enabled to transmit independent and separately encoded data streams from each of multiple transmit antennas using the same sub-carriers in the same OFDM symbol periods.

Multimedia Broadcast Multicast Service (MBMS) is a broadcasting service that can be offered via existing wireless, or cellular, communications networks such as Global System for Mobile communications (GSM) networks and Universal Mobile Telecommunications Service (UMTS) networks. However, several issues arise when attempting to implement MBMS in a 4G wireless communications network where base stations utilize a spatial multiplexing transmit scheme. Specifically, it is desirable to provide the MBMS service to both spatial multiplexing (SM) enabled user elements and non-SM enabled user elements. Another issue is that, especially for large cells, spatial multiplexing may not be able to be supported throughout the entire cell. As such, there is a need for a system and method for providing MBMS in a wireless network utilizing spatial multiplexing.

SUMMARY OF THE DETAILED DESCRIPTION

Systems and methods are disclosed herein for an enhanced Multimedia Broadcast Multicast Service (MBMS) in a wireless communications network. In one embodiment, a number of base stations in a MBMS zone, or broadcast region, accommodate both Spatial Multiplexing (SM) enabled user elements and non-SM enabled user elements. More specifically, resources within a downlink channel utilized by the base stations in the MBMS zone are partitioned into first resources allocated to a SM mode and second resources allocated to a non-SM mode. The resources of the downlink channel may be partitioned using a Time Division Multiplexing (TDM) scheme, a Frequency Division Multiplexing (FDM) scheme, or a hybrid TDM and FDM scheme. The base stations simultaneously broadcast multimedia content for a basic service to both SM enabled user elements and non-SM enabled user elements within the MBMS zone via the first resources of the downlink channel allocated for the non-SM mode using a non-SM transmit scheme. The base stations also simultaneously broadcast multimedia content for an enhanced service to SM enabled user elements within the MBMS zone via the second resources of the downlink channel allocated for the SM mode using a SM transmit scheme. By simultaneously broadcasting the multimedia content using the same resources of the downlink channel, the base stations for the MBMS zone form a Single Frequency Network (SFN) that substantially improves a Signal to Interference plus Noise Ratio (SINR) for user elements located near cell edges.

In another embodiment, a number of base stations form a MBMS zone, or broadcast region, where the MBMS zone is sub-divided into an SM zone and a non-SM zone. Base stations in both the SM zone and the non-SM zone simultaneously broadcast multimedia content for a basic service to SM enabled user elements within the SM zone. Base stations serving the SM zone simultaneously broadcast multimedia content for an enhanced service, in addition to the multimedia content for the basic service, to SM enabled user elements within the SM zone using an SM transmit scheme. SM enabled user elements within the SM zone operate in an SM reception mode while SM enabled user elements within the non-SM zone operate in a non-SM reception mode. Further, when moving from the SM zone to the non-SM zone, a SM enabled user element may switch from SM reception mode to non-SM reception mode. Likewise, when moving from the non-SM zone to the SM zone, a SM enabled user element may switch from non-SM reception mode to SM reception mode.

In another embodiment, the wireless communications network includes multiple MBMS zones. For each MBMS zone, base stations serving the MBMS zone transmit an MBMS zone identifier (ID) for the MBMS zone. A user element within an MBMS zone receives the MBMS zone ID for the MBMS zone. The MBMS zone ID may be used by the user element to decode information received from the base stations serving the MBMS zone such as, for example, signaling information. In addition or alternatively, MBMS zone IDs may be utilized by a user element to determine when a handoff from one MBMS zone to another MBMS zone is to be performed.

Those skilled in the art will appreciate the scope of the present invention and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the invention, and together with the description serve to explain the principles of the invention.

Figure 3:
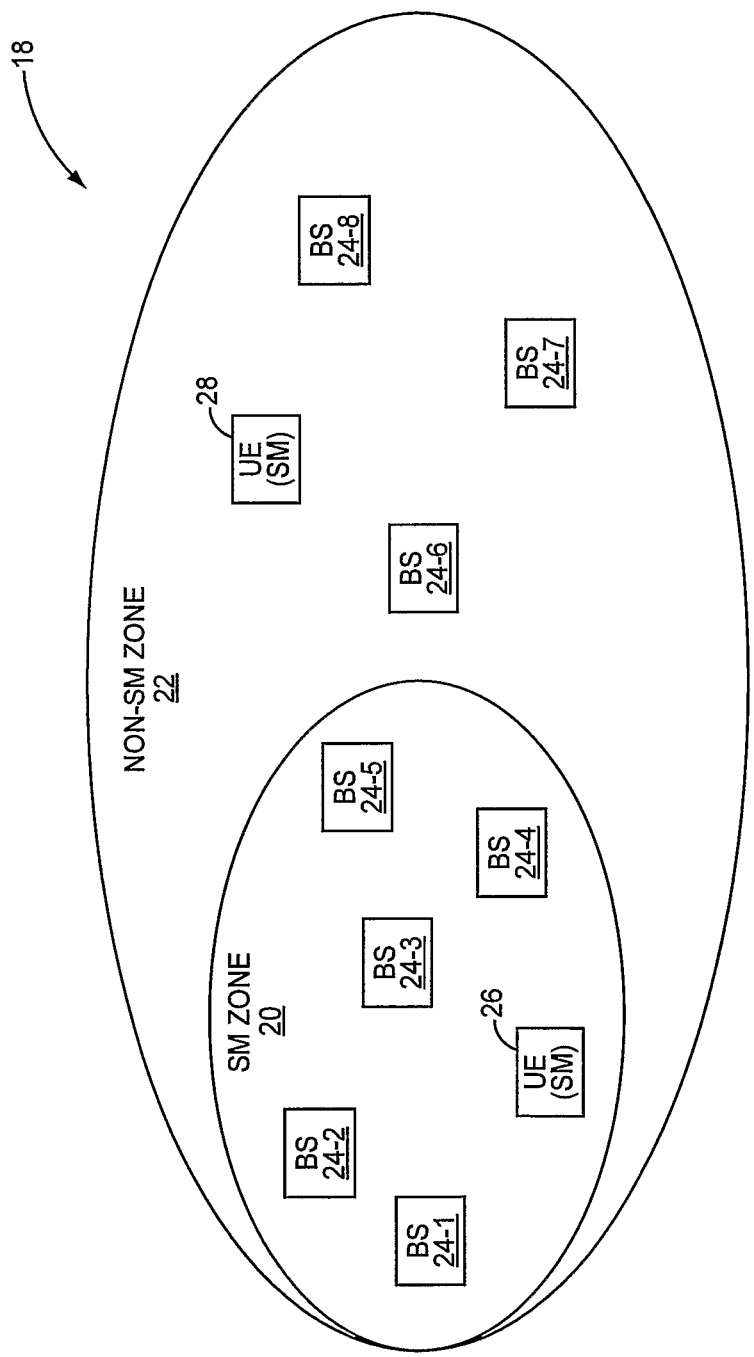
FIG. 3 illustrates a MBMS zone that includes a SM zone and a non-SM zone according to one embodiment of this disclosure.
Figure 4:
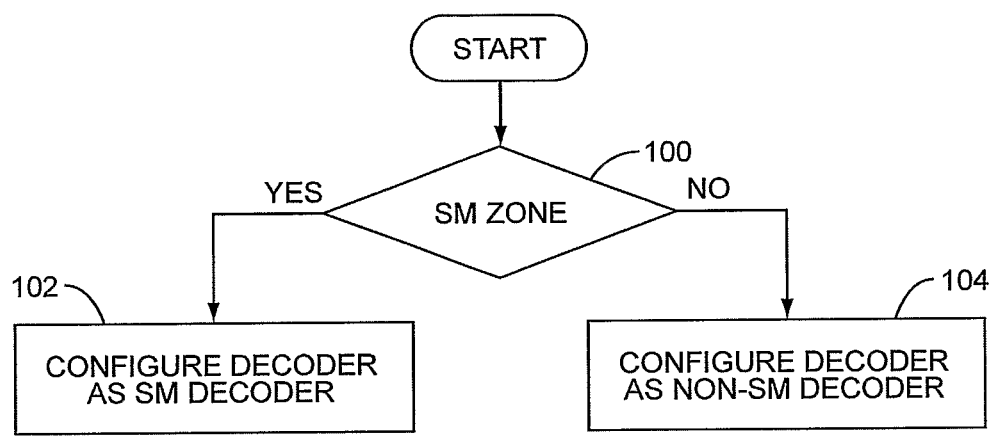
FIG. 4 is a flow chart illustrating a process by which a SM enabled user element located within the MBMS zone of FIG.
Figure 5:
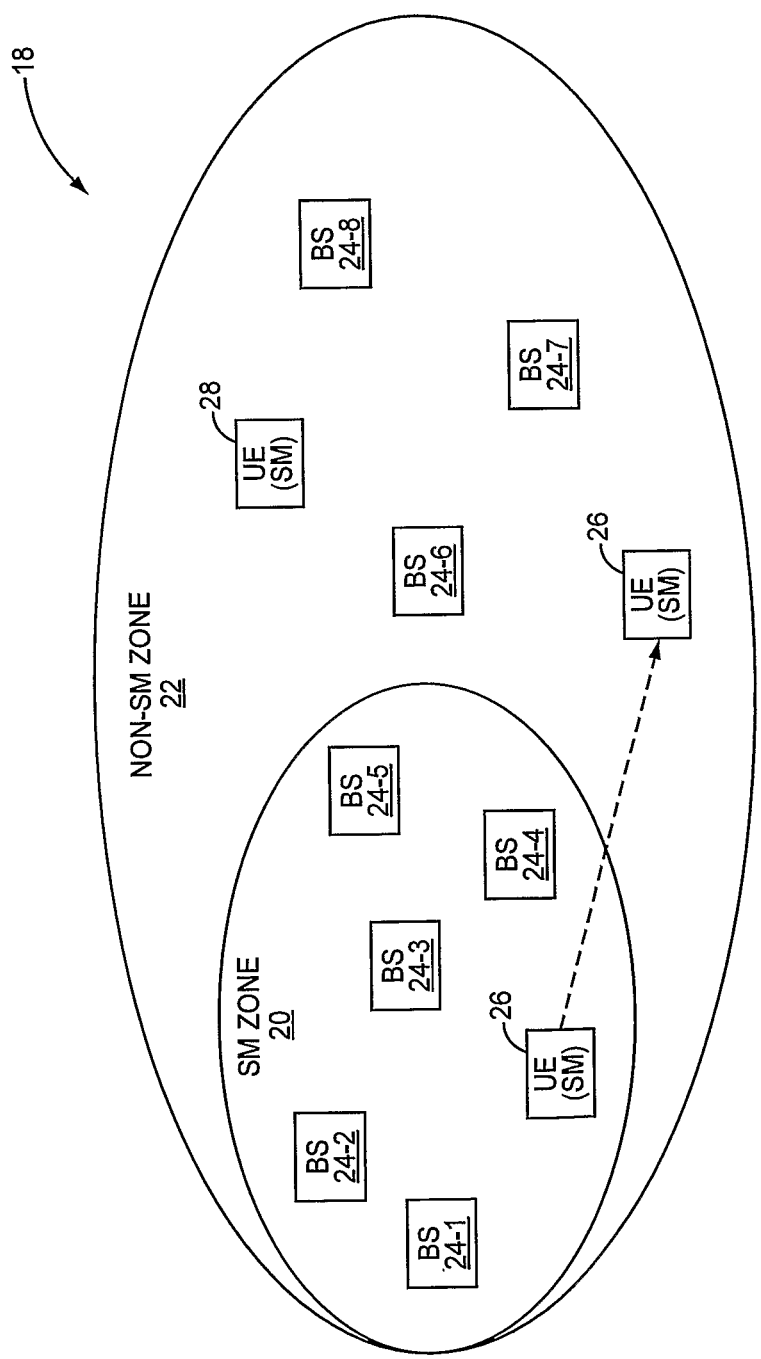
Figure 6:
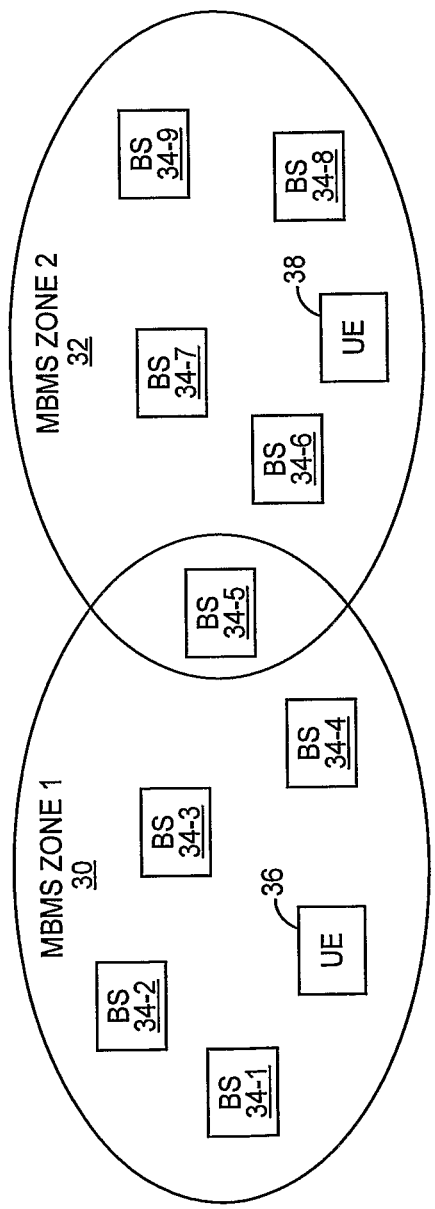
Figure 7:
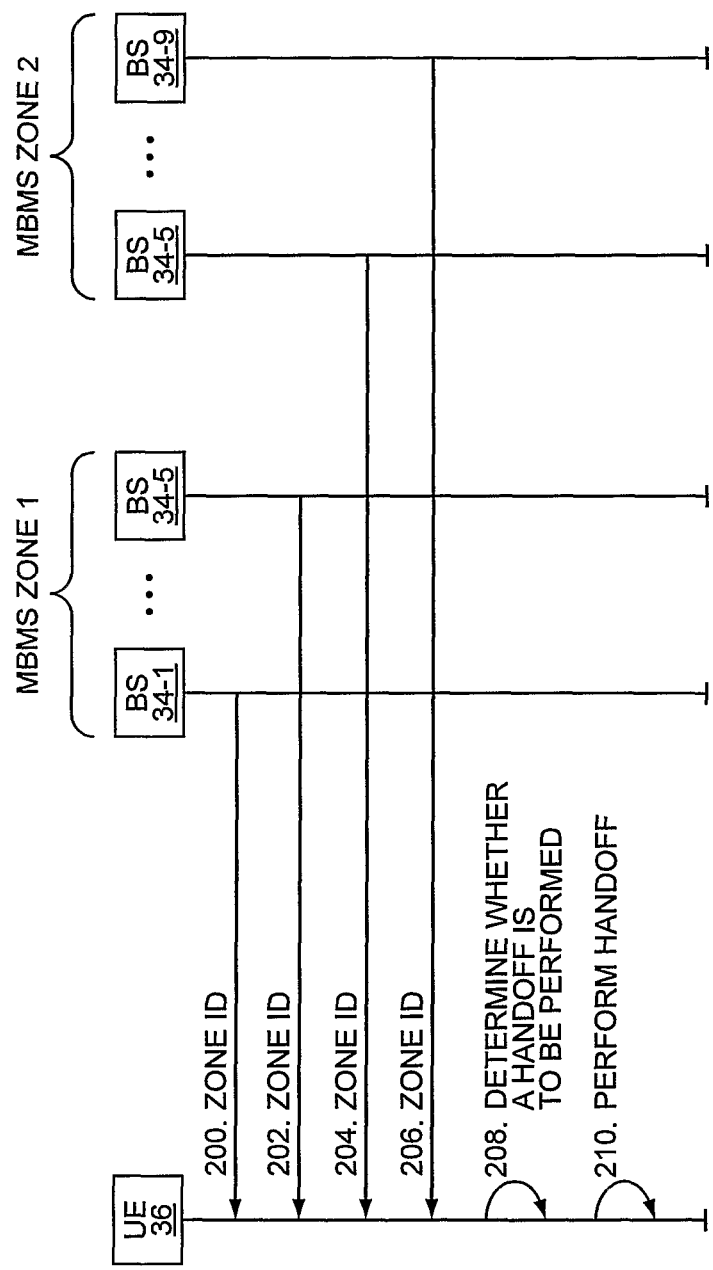
Figure 8A:
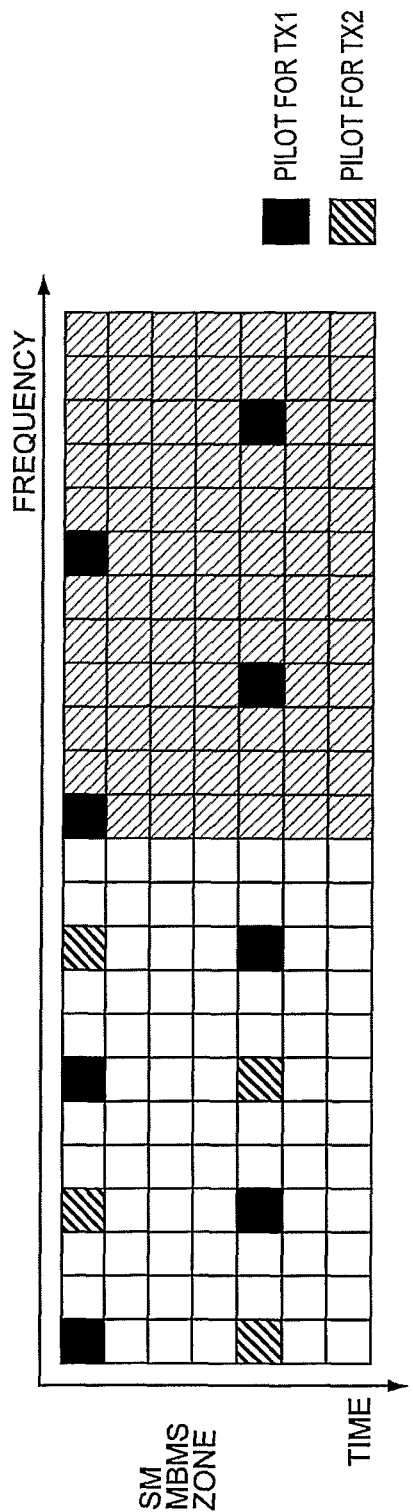
Figure 8B:
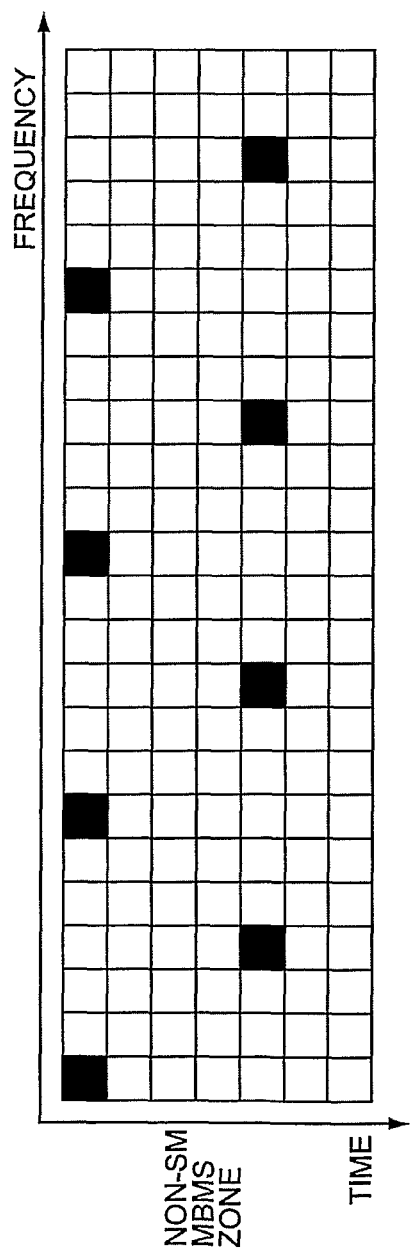
Figure 9:
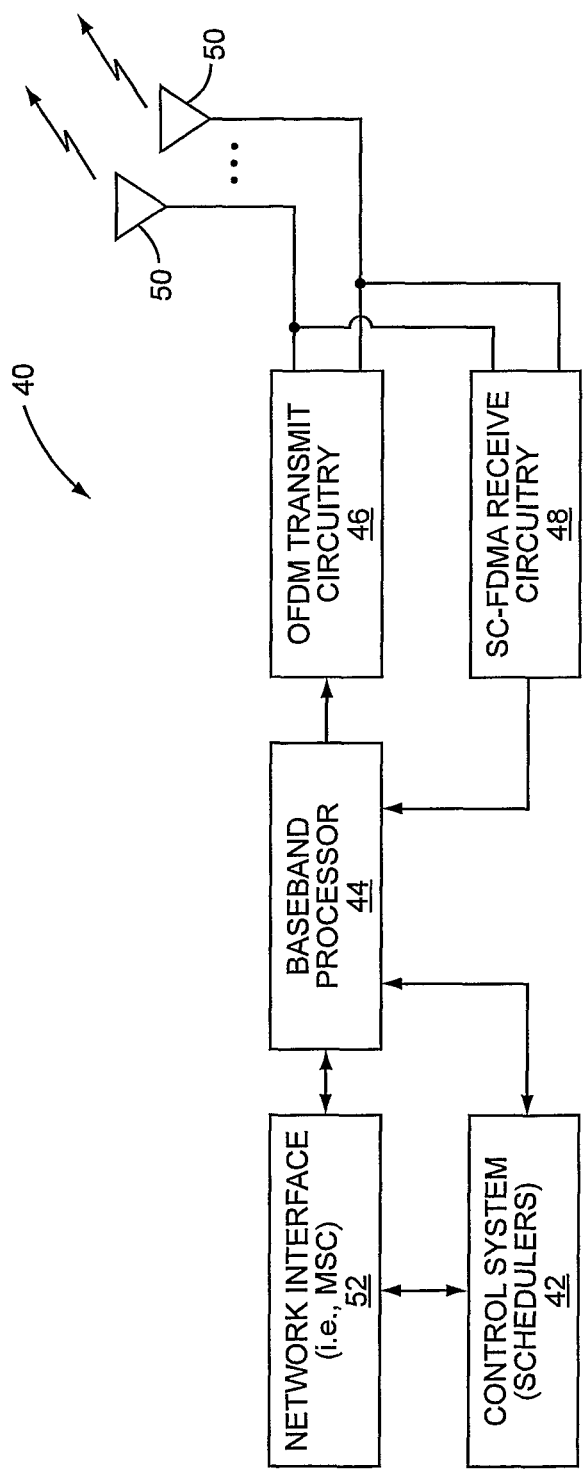
Figure 10:
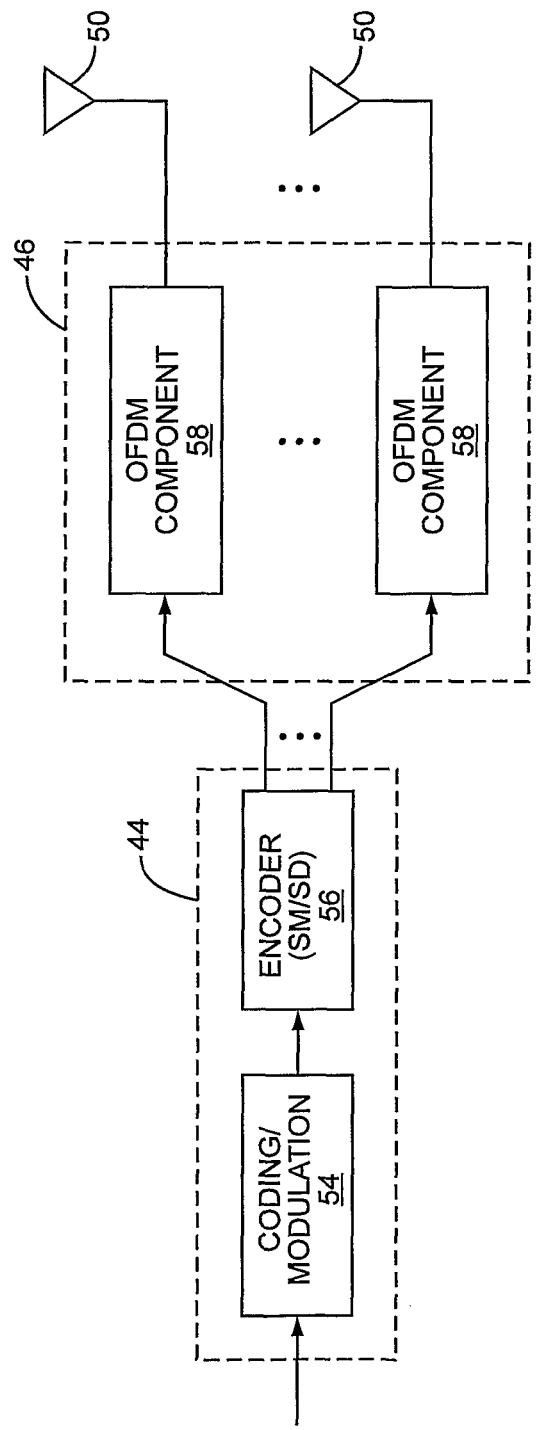
Figure 11:
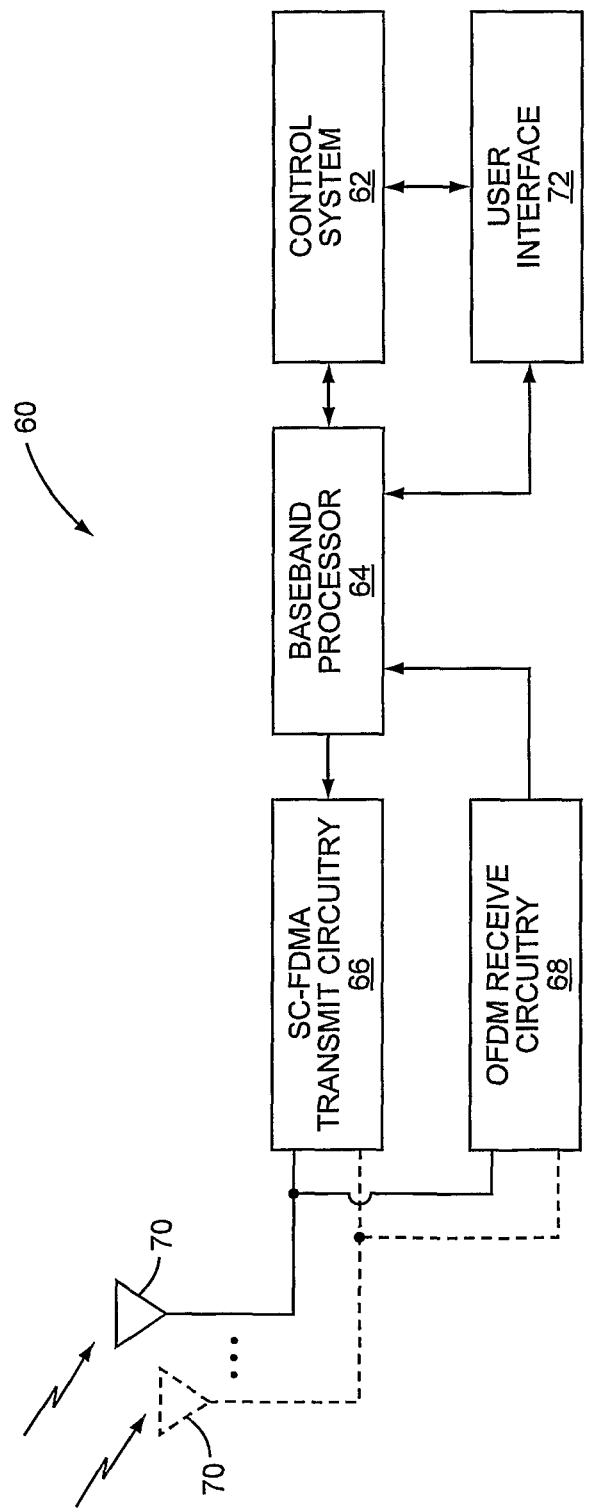
Figure 12A:
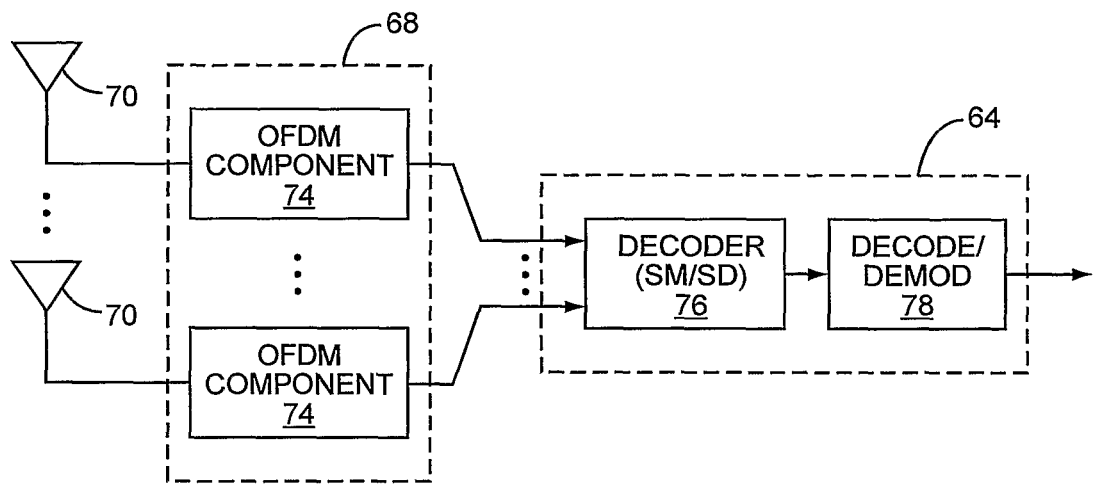
Figure 12B:
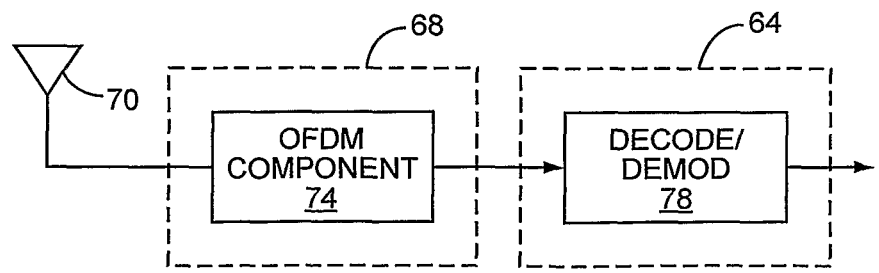
Figure 13A:
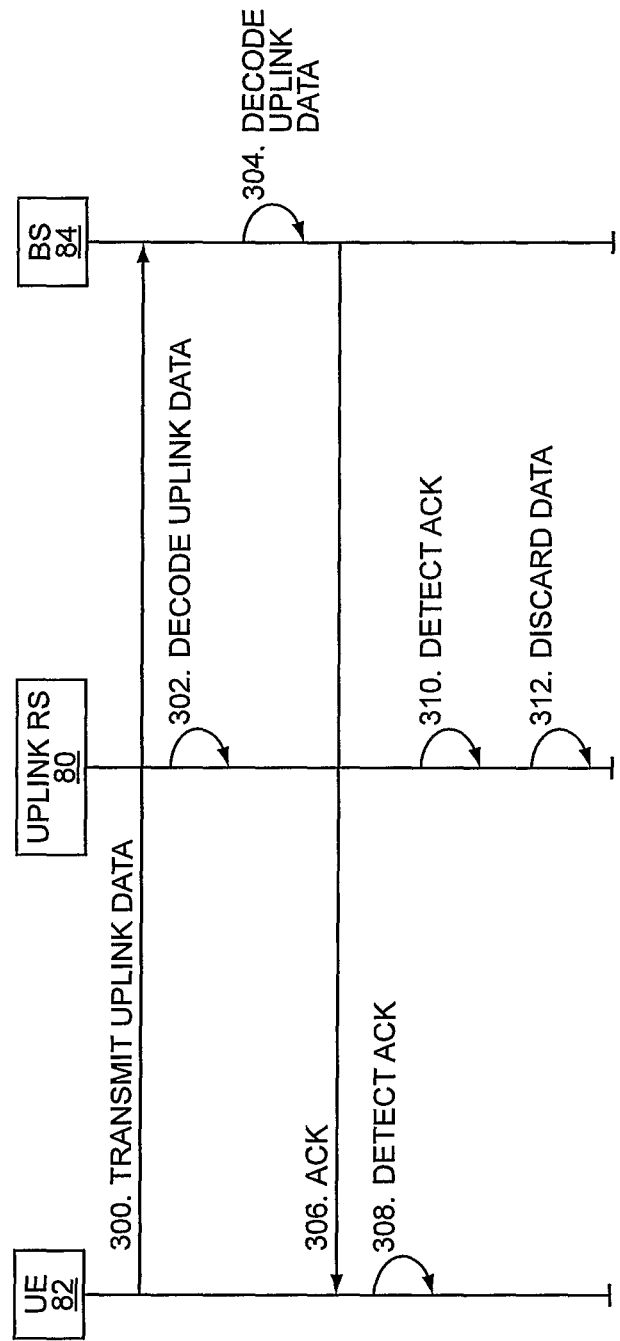
Figure 13B:
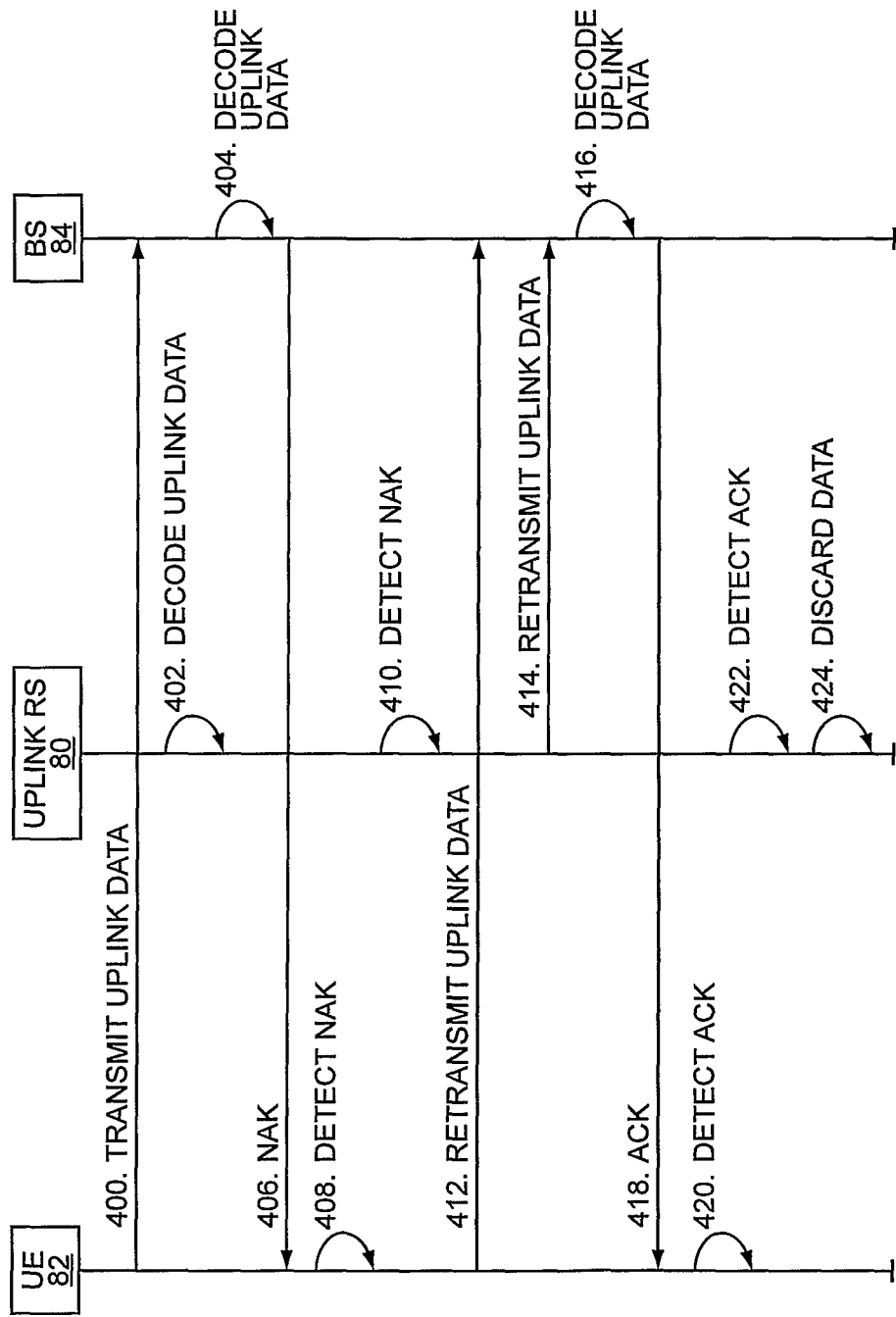
Figure 14:
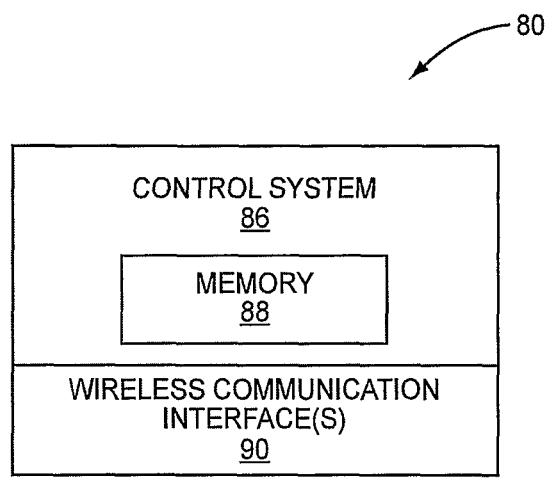

3 is enabled to select a reception mode based on whether the SM enabled user element is located in the SM zone or the non-SM zone according to one embodiment of this disclosure;

FIG. 5 illustrates a handoff of a user element from the SM zone to the non-SM zone of FIG. 3 using the process of FIG. 4 according to one embodiment of this disclosure;

FIG. 6 illustrates multiple MBMS zones within a wireless communications network according to one embodiment of this disclosure;

FIG. 7 illustrates a handoff process for a user element that moves from one MBMS zone to another MBMS zone according to one embodiment of this disclosure;

FIGS. 8A and 8B illustrate pilot patterns according to one embodiment of this disclosure;

FIG. 9 is a block diagram of a base station according to one embodiment of this disclosure;

FIG. 10 is a more detailed diagram of a portion of the base station of FIG. 9 according to one embodiment of this disclosure;

FIG. 11 is a block diagram of a user element according to one embodiment of this disclosure;

FIG. 12A is a more detailed block diagram of a portion of the user element of FIG. 11 wherein the user element is a SM enabled user element according to one embodiment of this disclosure;

FIG. 12B is a more detailed block diagram of a portion of the user element of FIG. 11 wherein the user element is a non-SM enabled user element according to one embodiment of this disclosure;

FIGS. 13A and 13B illustrate the operation of a transparent uplink relay station according to one embodiment of this disclosure; and FIG. 14 is a block diagram of the transparent uplink relay station of FIGS. 13A and 13B according to one embodiment of this disclosure.

DETAILED DESCRIPTION

The embodiments set forth below represent the necessary information to enable those skilled in the art to practice the invention and illustrate the best mode of practicing the invention. Upon reading the following description in light of the accompanying drawings, those skilled in the art will understand the concepts of the invention and will recognize applications of these concepts not particularly addressed herein. It should be understood that these concepts and applications fall within the scope of the disclosure and the accompanying claims.

Figure 1:
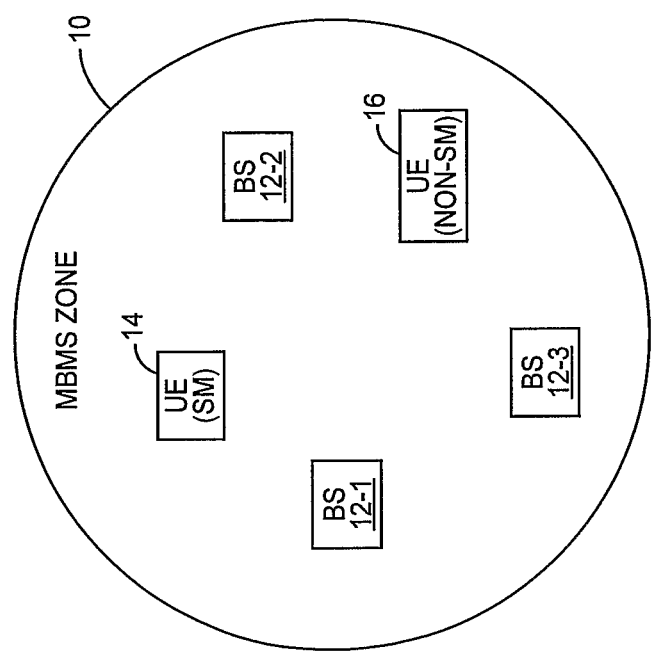
FIG. 1 illustrates a Multimedia Broadcast Multicast Service (MBMS) zone in a wireless communications network that accommodates both Spatial Multiplexing (SM) enabled user elements and non-SM enabled user elements according to one embodiment of this disclosure.

FIG. 1 illustrates a Multimedia Broadcast Multicast Service (MBMS) zone 10 of a wireless communications network according to one embodiment of this disclosure. The wireless communications network may be, for example, a Fourth Generation (4G) cellular communications network such as a Long Term Evolution (LTE) network, a WiMAX or IEEE 802.16 network, or the like. As illustrated, the MBMS zone 10 includes a number of base stations (BSs) 12-1 through 12-3 that are enabled to broadcast multimedia content to user elements within the MBMS zone 10, such as user elements (UEs) 14 and 16. In this embodiment, the base stations 12-1 through 12-3 have multiple transmit antennas, or in other words are Multiple-Input-Multiple-Output (MIMO) devices, and transmit data using a multiple sub-carrier modulation scheme such as, but not limited to, Orthogonal Frequency Division Multiplexing (OFDM).

In general, the base stations 12-1 through 12-3 broadcast multimedia content in such a manner as to accommodate both Spatial Multiplexing (SM) enabled user elements, such as the user element 14, and non-SM enabled user elements, such as the user element 16. More specifically, resources within a downlink channel utilized by the base stations 12-1 through 12-3 are allocated for a SM mode and other resources within the downlink channel are allocated for a non-SM mode. For OFDM, the resources allocated for the SM mode and the non-SM mode are sub-carriers during OFDM symbol time periods. As discussed below, the resources of the downlink channel may be partitioned for SM mode and non-SM mode using Time Division Multiplexing (TDM), Frequency Division Multiplexing (FDM), or a hybrid of TOM and FDM.

Using the resources allocated for the non-SM mode, the base stations 12-1 through 12-3 simultaneously broadcast multimedia content for a basic service to both the SM enabled user element 14 and the non-SM enabled user element 16 using a non-SM transmit scheme. For instance, the base stations 12-1 through 12-3 may simultaneously broadcast the multimedia content for the basic service using a spatial diversity transmit scheme. Using the base station 12-1 as an example, a spatial diversity transmit scheme is one where the base station 12-1 transmits the same data stream from each of the multiple transmit antennas of the base station 12-1 using the same time and frequency resources.

In addition, using the resources allocated for the SM mode, the base stations 12-1 through 12-3 broadcast multimedia content to the SM enabled user element 14 for an enhanced service using spatial multiplexing. Spatial multiplexing is a transmit scheme for MIMO devices wherein multiple transmit antennas transmit independent data streams using the same time and frequency resources of a transmit channel. Thus, again using the base station 12-1 as an example, when operating in SM mode, the base station 12-1 transmits independent data streams for the enhanced service from multiple transmit antennas of the base station 12-1.

Thus, using the resources allocated for non-SM mode, the base stations 12-1 through 12-3 simultaneously broadcast multimedia content for the basic service to both the SM enabled user element 14 and the non-SM enabled user element 16. In other words, using the resources allocated for the non-SM mode, the base stations 12-1 through 12-3 broadcast the same multimedia content for the basic service at the same time or substantially the same time over the same sub-carrier frequencies. Still further, each of the base stations 12-1 through 12-3 using the same modulation and coding scheme or substantially the same modulation and coding scheme. In addition, using the resources allocated for the SM mode, the base stations 12-1 through 12-3 simultaneously broadcast multimedia content for the enhanced service to the SM enabled user element 14. Again, in other words, using the resources allocated for the SM mode, the base stations 12-1 through 12-3 broadcast the same multimedia content for the enhanced service at the same time or substantially the same time over the same sub-carrier frequencies. Still further, each of the base stations 12-1 through 12-3 using the same modulation and coding scheme or substantially the same modulation and coding scheme. As an example, the basic service may be a regional television station, and the enhanced service may be a local television station. As another example, the basic service may be a national television station, and the enhanced service may be one or more regional television stations and/or one or more local television stations. Note that while television is discussed herein, the multimedia content broadcast by the base stations 12-1 through 12-3 is not limited thereto. Other types of exemplary multimedia content are radio content and newspaper content including text and images.

Figure 2A:
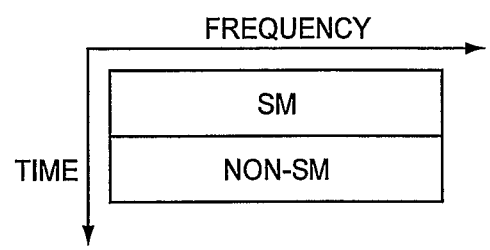
FIGS. 2A-2C illustrate a number of exemplary schemes for partitioning resources of a downlink channel utilized to broadcast multimedia content for the MBMS zone for both SM enabled user elements and non-SM enabled user elements.
Figure 2B:
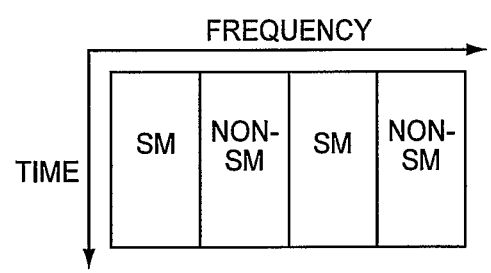
Figure 2C:
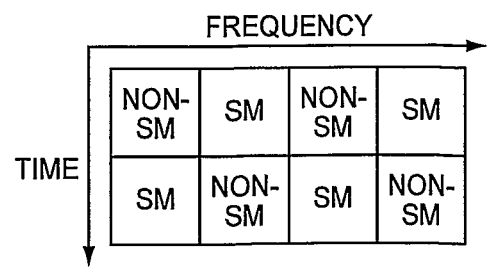

FIGS. 2A through 2C illustrate exemplary partitions of the resources of the downlink channel for SM mode and non-SM mode. More specifically, FIG. 2A illustrates an example wherein the resources of the downlink channel used to broadcast the multimedia content are partitioned using TDM such that all sub-carriers are allocated for SM mode during a first period of time and all sub-carriers are allocated for non-SM mode during a second period of time. The first and second periods of time may be, for example, sub-frames within a downlink frame. FIG. 2B illustrates an example wherein the resources of the downlink channel used to broadcast the multimedia content are partitioned using FDM such that different blocks of sub-carriers are allocated for SM mode and non-SM mode. For instance, one or more blocks of sub-carriers may be allocated for SM mode during a downlink frame while one or more different blocks of sub-carriers may be allocated for non-SM mode during the downlink frame. Lastly, FIG. 2C illustrates an example wherein the resources of the downlink channel used to broadcast the multimedia content are partitioned using a hybrid of TDM and FDM. For instance, different blocks of sub-carriers may be allocated for the SM mode and the non-SM mode during each sub-frame of a downlink frame.

FIG. 3 illustrates a MBMS zone 18 that is divided into an SM zone 20 and a non-SM zone 22 according to one embodiment of this disclosure. This embodiment may be particularly beneficial where spatial multiplexing may be not possible over the entire MBMS zone 18. This may occur where the cells served by base stations are relatively large such that Single Frequency Network (SFN) improvements in Signal to Interference plus Noise Ratio (SINR) are not sufficient to provide SM in all areas within the cells.

In this exemplary embodiment, the MBMS zone 18 is served by base stations 24-1 through 24-8, where the base stations 24-1 through 24-5 serve the SM zone 20 and the base stations 24-6 through 24-8 serve the non-SM zone 22. The base stations 24-1 through 24-8 have multiple transmit antennas, or in other words are MIMO devices, and transmit data using a multiple sub-carrier modulation scheme such as, but not limited to, OFDM. Further, the base stations 24-1 through 24-5 serving the SM zone 20 simultaneously broadcast multimedia content for a basic service to SM enabled user elements within the SM zone 20, such as user element 26, using a first layer or transmit antenna and simultaneously broadcast multimedia content for an enhanced service using one or more additional layers or transmit antennas using spatial multiplexing.

The base stations 24-6 through 24-8 broadcast the multimedia content for the basic service to SM enabled user elements within the non-SM zone 22, such as user element 28, using a non-SM transmission scheme. For instance, in one embodiment, the base stations 24-6 through 24-8 simultaneously broadcast the multimedia content for the basic service using spatial diversity. The SM enabled user element 28 operates in a non-SM reception mode. For instance, the SM enabled user element 28 may have a decoder that is configurable in either a SM mode or a spatial diversity (SD) mode, wherein the decoder is configured in the SM mode when the user element 28 is in the SM zone 20 and configured in the SD mode when the user element 28 is in the non-SM zone 22. Importantly, the base stations 24-1 through 24-8 in both the SM zone 20 and the non-SM zone 22 simultaneously broadcast the multimedia content for the basic service using the same resources in the downlink channel. As a result, the MBMS zone 18 has advantages of a SFN, namely, improved SINR for user elements located near the cell edges as a result of over-the-air combining of the same signals transmitted by the base stations of neighboring cells.

In the MBMS zone 18, SM enabled user elements, such as the user elements 26 and 28, are enabled to perform handoffs when moving between the SM zone 20 and the non-SM zone 22. FIG. 4 illustrates a process that may be performed by a SM enabled user element, such as the user elements 26 and 28, in order to perform a handoff between the SM zone 20 and the non-SM zone 22 as needed. More specifically, using the user element 26 as an example, the user element 26 determines whether the user element 26 is located with the SM zone 20 or the non-SM zone 22 (step 100). In one embodiment, the user element 26 determines whether the user element 26 is in the SM zone 20 or the non-SM zone 22 using a blind decoding technique. Specifically, the user element 26 may include a decoder that is configurable as either a SM decoder or a non-SM decoder (e.g., a SD decoder). Initially, the decoder may be configured as a SM decoder. If the decoder is able to properly decode the SM broadcast signals from the base stations 24-1 through 24-5 in the SM zone 20, then the user element 26 determines that the user element 26 is in the SM zone 20, and the decoder remains configured as a SM decoder. If the decoder is unable to properly decode the SM broadcast signals from the base stations 24-1 through 24-5 in the SM zone 20, the user element 26 determines that the user element 26 is in the non-SM zone 22.

In an alternative embodiment, the user element 26 may determine whether the user element 26 is in the SM zone 20 or the non-SM zone 22 based on information received from one or more of the base stations 24-1 through 24-8. For instance, the base stations 24-1 through 24-8 may, from time-to-time, transmit information identifying whether the base stations 24-1 through 24-8 are in the SM zone 20 or the non-SM zone 22. Using the base station 24-1 as an example, the base station 24-1 may transmit information that identifies the base station 24-1 as being within the SM zone 20. The information transmitted may be, for example, a data sequence transmitted over an access channel identifying the base station 24-1 as belonging to either the SM zone 20 or the non-SM zone 22 or signaling information transmitted over a signaling channel.

Once the user element 26 has determined whether the user element 26 is in the SM zone 20 or the non-SM zone 22, the user element 26 configures its decoder accordingly. More specifically, if the user element 26 determines that the user element 26 is in the SM zone 20, the user element 26 enters a SM reception mode by, in this example, configuring the decoder of the user element 26 as a SM decoder (step 102). If the user element 26 determines that the user element 26 is not in the SM zone 20, or is in the non-SM zone 22, the user element 26 enters a non-SM reception mode by, in this example, configuring the decoder of the user element 26 as a non-SM decoder such as a SD decoder (step 104).

Using the process of FIG. 4, when the user element 26 moves from the SM zone 20 to the non-SM zone 22, the user element 26 determines that the user element 26 is no longer able to decode the SM broadcast signals from the base stations 24-1 through 24-5. The user element 26 then performs a handoff to the non-SM zone 22 by configuring the decoder of the user element 26 to as a non-SM decoder. In a similar manner, when the user element 26 moves from the non-SM zone 22 to the SM zone 20, the user element 26 determines that the user element 26 can now properly decode the SM broadcast signals from the base stations 24-1 through 24-5 in the SM zone 20. As such, the user element 26 performs a handoff from the non-SM zone 22 to the SM zone 20 by configuring the decoder of the user element 26 to operate as a SM decoder.

FIG. 5 illustrates an exemplary handoff of the user element 26 from the SM zone 20 to the non-SM zone 22 using the process of FIG. 4. As illustrated, initially, the user element 26 is in the SM zone 20. As such, the user element 26 is enabled to properly decode the SM broadcast signals from the base stations 24-1 through 24-5, and the user element 26 is configured in the SM reception mode. Then, once the user element 26 moves from the SM zone 20 to the non-SM zone 22, the user element 26 is no longer able to properly decode the SM broadcast signals from the broadcast stations 24-1 through 24-5. As such, the user element 26 determines that the user element 26 is in the non-SM zone 22 and therefore performs a handover from the SM zone 20 to the non-SM zone 22 by entering the non-SM reception mode.

It should be noted that while the embodiments of FIGS. 1-2C and FIGS. 3-5 are discussed separately, these embodiments may be used in combination. More specifically, the MBMS zone 18 may support both SM enabled and non-SM enabled user elements in the manner discussed above with respect to FIGS. 1-2C.

FIG. 6 illustrates two MBMS zones 30 and 32 wherein base stations 34-1 through 34-9 serving the MBMS zones 30 and 32 transmit zone identifiers (IDs), or similar information, according to one embodiment of this disclosure. Note that while zone IDs are discussed herein, it should be appreciated that any information identifying which MBMS zone 30 or 32 each of the base stations 34-1 through 34-9 is located in may be used. The base stations 34-1 through 34-5 each transmit a zone ID for the MBMS zone 30 to user elements, such as user element 36, within the MBMS zone 30. Likewise, the base stations 34-5 through 34-9 each transmit a zone ID for the MBMS zone 32 to user elements, such as user element 38, within the MBMS zone 32. The zone IDs may be transmitted as corresponding sequences within an access channel or as signaling information within a signaling channel. Note that the MBMS zones 30 and 32 overlap and that the base station 34-5 in within both of the MBMS zones 30 and 32. As such, the base station 34-5 transmits both the zone ID for the MBMS zone 30 and the zone ID for the MBMS zone 32.

The zone IDs may be used for decoding. More specifically, the zone ID or other information identifying the base stations 34-1 through 34-5 as belonging to the MBMS zone 30 may enable user elements within the MBMS zone 30, such as the user element 36, to identify decoding parameters needed to decode the signals broadcast by the base stations 34-1 through 34-5 for the MBMS zone 30. For example, the decoding parameters may be a scrambling code, interleaver, pilot pattern, or the like. Likewise, the zone ID or other information identifying the base stations 34-5 through 34-9 as belonging to the MBMS zone 32 may enable user elements within the MBMS zone 32, such as the user element 38, to identify decoding parameters needed to decode the signals broadcast by the base stations 34-5 through 34-9 for the MBMS zone 32. In addition or alternatively, the zone IDs may be used to indicate secondary information such as data service/type or the like.

FIG. 7 illustrates a handoff process for the user element 36 when moving from the MBMS zone 30 to the MBMS zone 32 of FIG. 6 according to one embodiment of this disclosure. First, when the user element 36 is near the boundary between the MBMS zones 30 and 32, the user element 36 receives zone IDs from both the base stations 34-1 through 34-5 for the MBMS zone 30 and the base stations 34-5 through 34-9 for the MBMS zone 32 (steps 200-206). The user element 36 then determines whether a handoff from the MBMS zone 30 to the MBMS zone 32 is to be performed (step 208). For example, if the strength of the signals received from the base stations 34-1 through 34-5 for the MBMS zone 30 is greater than the strength of the signals received from the base stations 34-5 through 34-9 for the MBMS zone 32, then the user element 36 determines that a handoff is not to be performed. However, if the strength of the signals received from the base stations 34-5 through 34-9 for the MBMS zone 32 is greater than the strength of the signals received from the base stations 34-1 through 34-5 for the MBMS zone 30, then the user element 36 determines that a handoff is to be performed. Note that other thresholds may be used in order to determine whether a handoff is to be performed. For instance, a handoff may be performed from the MBMS zone 30 to the MBMS zone 32 when the strength of the signals from the base stations 34-5 through 34-9 reach a predetermined threshold.

In this example, a handoff is to be performed. As such, the user element 36 performs the handoff from the MBMS zone 30 to the MBMS zone 32 (step 210). As discussed above, the zone ID may be used to identify the appropriate decoding parameters. In this case, the user element 36 performs the handoff by identifying the decoding parameters for the MBMS zone 32 based on the zone ID and reconfiguring a decoder of the user element 36 with the decoding parameters for the MBMS zone 32. Note that while the discussion above focuses on zone IDs for the MBMS zones 30 and 32, it should be noted that each service may be assigned a different zone ID such that there are different MBMS zones for different services.

FIGS. 8A and 8B illustrate exemplary pilot patterns for the SM zone 20 and the non-SM zone 22 of FIG. 3 according to one embodiment of this disclosure. As will be appreciated by one of ordinary skill in the art, pilot symbols are utilized to generate channel estimates for the decoding process. Different pilot symbols are required for each layer, or transmit antenna. A pilot pattern defines symbol locations within a transmit frame or sub-frame at which pilot symbols are to be located. FIG. 8A illustrates a pilot symbol pattern for the SM zone 20, where in this example the resources of the downlink channel for the SM zone 20 are partitioned for SM mode and non-SM mode in order to accommodate non-SM capable user elements in the manner discussed above with respect to FIG. 1. The pilot symbol pattern for the SM zone 20 includes pilot symbol locations for a first layer or transmit antenna used to broadcast the multimedia content for the basic service and additional pilot symbol locations for a second layer or second transmit antenna in the resource block allocated for SM mode. Common pilots are shared by the SM mode and the non-SM mode.

FIG. 8B illustrates a pilot symbol pattern for the non-SM zone 22. The pilot symbol pattern for the non-SM zone 22 includes the same pilot symbol locations as the pilot symbol pattern for the SM zone 20 for the primary layer or transmit antenna used to broadcast the multimedia content for the basic service. This enables true SFN operation for the SM zone 20 and the non-SM zone 22.

The pilot symbol patterns discussed above are also applicable to the multiple MBMS zones 30 and 32 of FIG. 6. However, while the pilot symbol locations are preferably the same, each of the MBMS zones 30 and 32 uses a different modulation code, or sequence, to modulate the pilot symbols. Thus, the base stations 34-1 through 34-5 may use a first modulation code to modulate the pilot symbols for the MBMS zone 30, and the base stations 34-5 through 34-9 may use a second modulation code to modulate the pilot symbols for the MBMS zone 32. The modulation code for the pilot symbols may be determined based on the zone ID of the MBMS zone 30 or 32.

If a base station belongs to more than one MBMS zone, such as the case with the base station 34-5 of FIG. 6, then one of the following exemplary schemes may be used for that base station. Note that a base station belonging to more than one MBMS zone, such as the base station 34-5, may provide all or some of the services from each of the different MBMS zones with orthogonal channel resources or different layers. Using the base station 34-5 of FIG. 6 as an example, in one embodiment, the base station 34-5 may broadcast MBMS data for the MBMS zones 30 and 32 in different time slots such as, for example, different sub-frames. The modulation code used to modulate the pilot symbols in a particular time slot may then be determined based on the corresponding MBMS zone for which the data is being transmitted.

In another embodiment, the base station 34-5 may broadcast MBMS data for the MBMS zones 30 and 32 using different sub-carriers. The modulation code used to modulate the pilot symbols for a particular sub-carrier may then be determined based on the corresponding MBMS zone for which the data on the sub-carrier is being transmitted. In yet another embodiment, the base station 34-5 may broadcast MBMS data for the MBMS zones 30 and 32 using different MIMO layers. The modulation code used to modulate the pilot symbols for a particular MIMO layer may then be determined based on the corresponding MBMS zone.

FIG. 9 is a block diagram of a base station 40. This discussion of the base station 40 is applicable to the base stations 12-1 through 12-3, 24-1 through 24-9, and 34-1 through 34-9 discussed herein. As illustrated, the base station 40 generally includes a control system 42, a baseband processor 44, OFDM transmit circuitry 46, receive circuitry 48 which in this example is Single-Carrier Frequency Division Multiple Access (SC-FDMA) receive circuitry, multiple antennas 50, and a network interface 52. FIG. 10 illustrates the baseband processor 44 and the OFDM transmit circuitry 46 of FIG. 9 in more detail. As illustrated, a coding/modulation primitive 54 is responsible for encoding, interleaving, and modulating binary data to generate data symbols, as is well known to those skilled in the art. The coding/modulation primitive 54 may include a number of processing blocks, not shown in FIG. 10. An encoder 56 applies either spatial multiplexing encoding or spatial diversity encoding to the data symbols depending on the mode of operation. The encoder 56 also separates the data symbols into different processing paths to corresponding OFDM components 58. Each OFDM component 58 receives data symbols from the encoder 56, processes the data symbols according to a desired OFDM modulation scheme, and transmits the modulated data symbols via the corresponding antenna 50.

FIG. 11 is a block diagram of a user element 60. This discussion of the user element 60 is applicable to the user elements 14, 16, 26, 28, 36, and 38 discussed herein. As illustrated, the user element 60 generally includes a control system 62, a baseband processor 64, transmit circuitry 66 which in this example is SC-FDMA transmit circuitry, OFDM receive circuitry 68, multiple antennas 70, and a user interface 72. FIG. 12A illustrates the baseband processor 64 and the OFDM receive circuitry 68 of FIG. 11 for an embodiment wherein the user element 60 is SM enabled. As illustrated, the user element 60 includes multiple OFDM components 74, each connected to one of the antennas 70. Each OFDM component 74 processes received signals according to the desired OFDM modulation scheme, as will be appreciated by one of ordinary skill in the art. The OFDM components 74 output data symbols to a decoder 76. The decoder 76 applies either spatial multiplexing decoding or spatial diversity decoding and passes the symbols to a decoding/demodulating primitive 78 responsible for decoding, de-interleaving, and demodulating the symbols to generate output binary data, as is well known to those skilled in the art. The decoding/demodulation primitive 78 may include a number of additional processing blocks, which are not shown in FIG. 12A. FIG. 12B is similar to FIG. 12A. However, FIG. 12B illustrates the baseband processor 64 and the OFDM receive circuitry 68 of FIG. 11 for an embodiment wherein the user element 60 is not SM enabled. In this embodiment, there is only one OFDM component 74.

FIGS. 13A and 13B illustrate the operation of a transparent uplink relay station (RS) 80 according to another embodiment of this disclosure. Note the transparent uplink RS 80 may be utilized in any type of cellular communications network and is not to be construed as being limited to a cellular communications network providing MBMS based on the discussion above. The transparent uplink RS 80 may be utilized in any type of wireless communications network such as an LTE cellular communications network, a WiMAX or IEEE 802.16 network, or the like. More specifically, as illustrated in FIG. 13A, a user element 82 first transmits uplink data to a base station 84 according to an uplink grant (step 300). Both the transparent uplink RS 80 and the base station 84 decode the uplink data (steps 302 and 304). Note that prior to step 300, the transparent uplink RS 80 preferably decodes uplink grant information transmitted by the base station 84 for the user element 82. In this embodiment, the base station 84 decodes the uplink data correctly. As such, the base station 84 sends an acknowledgement (ACK) message to the user element 82 (step 306). Both the user element 82 and the transparent uplink RS 80 detect the ACK message (steps 308 and 310). As such, no relay is need. Therefore, the transparent uplink RS 80 discards the uplink data (step 312).

FIG. 13B illustrates the operation of the transparent uplink RS 80 where the uplink data is not correctly decoded by the base station 84. As illustrated, the user element 82 first transmits uplink data to the base station 84 according to an uplink grant (step 400). Both the transparent uplink RS 80 and the base station 84 decode the uplink data (steps 402 and 404). In this embodiment, the base station 84 does not decode the uplink data correctly. As such, the base station 84 sends an NAK message to the user element 82 (step 406). Both the user element 82 and the transparent uplink RS 80 detect the NAK message (steps 408 and 410). As such, assuming the transparent uplink RS 80 decoded the uplink data correctly, the user element 82 retransmits the uplink data (step 412), and the transparent uplink RS 80 also retransmits the uplink data simultaneously with the retransmission of the uplink data from the user element 82 (step 414). Preferably, the transparent uplink RS 80 retransmits the uplink data using the same physical, or radio, resources (e.g., time and frequency) as well as the same modulation and coding scheme as the user element 82 such that the retransmission of the uplink data from the user element 82 and the transparent uplink RS 80 combine over the air (i.e., at the receive antenna(s) of the base station 84), thereby improving the SINR of the corresponding signal received by the base station 84. The base station 84 decodes the uplink data (step 416). Assuming the base station 84 decoded the uplink data correctly, the base station 84 sends an ACK message to the user element 82 (step 418). In this embodiment, both the user element 82 and the transparent uplink RS 80 detect the ACK (steps 420 and 422). The transparent uplink RS 80 then discards the uplink data (step 424).

The user element 82 and the base station 84 are implemented in hardware. For example, the user element 82 may be implemented similar to the user element 60 of FIG. 11, and the base station 84 may be implemented similar to the base station 40 of FIG. 9. FIG. 14 is a block diagram of the transparent uplink RS 80 according to one embodiment of this disclosure. As illustrated, the transparent uplink RS 80 includes a control system 86, which may have associated memory 88. The control system 86 is implemented in hardware. For instance, the control system 86 may be implemented as one or more central processing units (CPUs), one or more Application Specific Integrated Circuits (ASICs), one or more Field Programmable Gate Arrays (FPGAs), or the like, or any combination thereof. The functions of the transparent uplink RS 80 may be implemented in software and stored in the memory 88, implemented as hardware functions within the control system 86, or a combination thereof. The transparent uplink RS 80 also includes one or more wireless communication interfaces 90 for sending messages to and/or receiving messages from the user element 82 and the base station 84 as needed.

Preferably, the transparent uplink RS 80 is independent of wireless communications standards and transparent to the user element 82. The base station 84 may have knowledge of the transparent uplink RS 80 and treat the transparent uplink RS 80 the same as the user element 82. A scheduler of the base station 84 may be enabled to sense the existence of the transparent uplink RS 80 using, for example, channel statistics and employ a relay trigging scheduling approach to fully take advantage of the transparent uplink RS 80. The transparent uplink RS 80 makes synchronous Hybrid Automatic Repeat Request (H-ARQ) easy to implement, as there is no coordination needed between the transparent uplink RS 80 and the user element 82. Also, preferably, the transparent uplink RS 80 does not have any signaling of its own and does not take any additional radio resources.

Those skilled in the art will recognize improvements and modifications to the embodiments of the present invention. All such improvements and modifications are considered within the scope of the concepts disclosed herein and the claims that follow.

What is claimed is:

1. A wireless communications network providing Multimedia Broadcast Multicast Service (MBMS) comprising:
one or more first base stations serving a first MBMS zone and configured to transmit information identifying the one or more first base stations as belonging to the first MBMS zone; and
one or more second base stations serving a second MBMS zone and configured to transmit information identifying the one or more second base stations as belonging to the second MBMS zone;
wherein a plurality of user elements located in the first and second MBMS zones are enabled to transition between the first and second MBMS zones based on the information transmitted by the one or more first base stations identifying the one or more first base stations as belonging to the first MBMS zone and the information transmitted by the one or more second base stations identifying the one or more second base stations as belonging to the second MBMS zone, wherein the information comprises a respective MBMS zone ID which is used for decoding data in the corresponding zone, including in determining a scrambling code and a sequence for modulation of pilots of the respective MBMS zone.

2. The wireless communications network of claim 1, wherein the information transmitted by the one or more first base stations and the information transmitted by the one or more second base stations comprise respective sequences transmitted over an access channel.

3. The wireless communications network of claim 1, wherein transitioning between the first and second MBMS zones based on the information transmitted by the one or more first base stations identifying the one or more first base stations as belonging to the first MBMS zone and the information transmitted by the one or more second base stations identifying the one or more second base stations as belonging to the second MBMS zone comprises comparing signal strengths of signals transmitted by at least one of the one or more first base stations and signal strengths of signals transmitted by at least one of the one or more second base stations.

4. The wireless communications network of claim 1, wherein the pilots of each MBMS zone are scattered throughout the time and frequency resources of that MBMS zone according to a pilot pattern.

5. The wireless communications network of claim 1, wherein the one or more first base stations and the one or more second base stations comprises a plurality of antennas, wherein for each antenna configured for the first MBMS zone or the second MBMS zone, the pilot pattern is the same for the respective MBMS zone.

6. The wireless communications network of claim 1, wherein data of the first and second MBMS zones are transmitted in a different time slot and/or frequency band.

7. The wireless communications network of claim 1, wherein first and second pilot symbols of the first MBMS zone and the second MBMS zone of are transmitted on a different frequency band.

8. The wireless communications network of claim 1, wherein the information transmitted by the one or more first base stations and the information transmitted by the one or more second base stations are transmitted by each of the base stations periodically through a signaling channel.

9. The wireless communications network of claim 1, wherein a first base station is comprised in both the first one or more base stations and the second one or more base stations.

10. A base station providing Multimedia Broadcast Multicast Service (MBMS) comprising:
a wireless interface;
at least one processing element coupled to the wireless interface, the processing element configured to:
serve a first MBMS zone and transmit first information identifying the base station as belonging to a first MBMS zone; and
serve a second MBMS zone and transmit second information identifying the base station as belonging to a second MBMS zone;
wherein a plurality of user elements located in the first and second MBMS zones are enabled to transition between the first and second MBMS zones based on the first information transmitted by the base station identifying the base station as belonging to the first MBMS zone and the second information transmitted by the base station identifying the base station as belonging to the second MBMS zone, wherein each of the first information and the second information comprises a respective MBMS zone ID which is used for decoding data in the corresponding zone, including in determining a scrambling code, and a sequence for modulation of pilots of the respective MBMS zone.

11. The base station of claim 10, wherein the pilots of each MBMS zone are scattered throughout the time and frequency resources of that MBMS zone according to a pilot pattern.

12. The base station of claim 10, wherein the base station comprises a plurality of antennas, wherein for each antenna configured for the first MBMS zone or the second MBMS zone, the pilot pattern is the same for the respective MBMS zone.

13. The base station of claim 10, wherein data of the first and second MBMS zones are transmitted in a different time slot and/or frequency band.

14. The base station of claim 10, wherein first and second pilot symbols of the first MBMS zone and the second MBMS zone of are transmitted on a different frequency band.

15. The base station of claim 10, wherein the first information and the second information are transmitted by each of the base station periodically through a signaling channel.

16. A method for providing Multimedia Broadcast Multicast Service (MBMS) comprising:
by a base station:
serving a first MBMS zone and transmitting first information identifying the base station as belonging to a first MBMS zone; and
serving a second MBMS zone and transmitting second information identifying the base station as belonging to a second MBMS zone;
wherein a plurality of user elements located in the first and second MBMS zones are enabled to transition between the first and second MBMS zones based on the first information transmitted by the base station identifying the base station as belonging to the first MBMS zone and the second information transmitted by the base station identifying the base station as belonging to the second MBMS zone, wherein each of the first information and the second information comprises a respective MBMS zone ID which is used for decoding data in the corresponding zone, including in determining a scrambling code, and a sequence for modulation of pilots of the respective MBMS zone.

17. The method of claim 16, wherein the pilots of each MBMS zone are scattered throughout the time and frequency resources of that MBMS zone according to a pilot pattern.

18. The method of claim 16, wherein the base station comprises a plurality of antennas, wherein for each antenna configured for the first MBMS zone or the second MBMS zone, the pilot pattern is the same for the respective MBMS zone.

19. The method of claim 16, wherein data of the first and second MBMS zones are transmitted in a different time slot and/or frequency band.

20. The method of claim 16, wherein first and second pilot symbols of the first MBMS zone and the second MBMS zone of are transmitted on a different frequency band.

* * * * *